(12) United States Patent
Khan et al.

(10) Patent No.: US 11,751,065 B2
(45) Date of Patent: Sep. 5, 2023

(54) FIRST GRANT REQUEST OPTIMIZATION BASED ON GEOGRAPHIC LOCATION

(71) Applicant: ARRIS Enterprises LLC, Suwanee, GA (US)

(72) Inventors: Awaiz Khan, Milpitas, CA (US); Ravi Sharma, Santa Clara, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/800,162

(22) Filed: Feb. 25, 2020

(65) Prior Publication Data
US 2021/0266752 A1     Aug. 26, 2021

(51) Int. Cl.
*H04W 72/00* (2023.01)
*H04W 16/14* (2009.01)
*H04W 64/00* (2009.01)
*H04W 28/26* (2009.01)

(52) U.S. Cl.
CPC ........... *H04W 16/14* (2013.01); *H04W 28/26* (2013.01); *H04W 64/003* (2013.01)

(58) Field of Classification Search
CPC ....... H04W 88/02; H04W 88/06; H04W 4/02; H04W 92/02; H04W 76/02; H04W 64/00; H04W 24/00; H04W 72/04; H04W 72/082; H04W 16/10; H04W 16/14; H04W 28/04; H04W 28/16; H04W 64/003; H04W 28/26

USPC ................ 455/456.1, 422.1, 450, 452.1, 454
See application file for complete search history.

(56) References Cited

U.S. PATENT DOCUMENTS

| 2018/0115905 A1* | 4/2018 | Sirotkin .............. H04W 16/14 |
| 2019/0215698 A1* | 7/2019 | Balachandran ... H04W 72/0453 |
| 2020/0228993 A1* | 7/2020 | Gunasekara ......... H04W 16/14 |
| 2020/0252124 A1* | 8/2020 | Smyth .................. H04W 16/20 |
| 2020/0267563 A1* | 8/2020 | Sevindik .............. H04W 16/14 |

* cited by examiner

*Primary Examiner* — Temica M Beamer
(74) *Attorney, Agent, or Firm* — Steven Stupp; Stewart Wiener (57) ABSTRACT

During operation, a radio node may receive location information relating to a location of the radio node. Then, the radio node may provide a grant request to a computer, where the grant request includes a request to reserve a portion of a shared-license-access band of frequencies for use by the radio node based at least in part on the location information. Note that the location information may indicate whether the radio node is included in a geographic region. For example, the geographic region may include locations within a pre-defined distance from a boundary, such as a coastline. When the location information indicates the radio node is included in the geographic region, the portion of the shared-license-access band of frequencies may be outside of a second portion of the shared-license-access band of frequencies that is selectively used by a government user or a satellite service.

20 Claims, 5 Drawing Sheets

FIRST GRANT REQUEST OPTIMIZATION BASED ON GEOGRAPHIC LOCATION

BACKGROUND

Field

The described embodiments relate to techniques for communicating information among electronic devices. Notably, the described embodiments relate to techniques for improving a likelihood of approval of a first grant request based on geographic location.

Related Art

While many electronic devices communicate with each other via large networks owned by a network operator, small-scale networks associated with entities (such as a company or an organization) are increasingly common. In principle, the small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being used by large networks and small-scale networks. For example, the shared-license-access band of frequencies near 3.5 GHz (notably, the 150 MHz of bandwidth between 3.55 GHz and 3.7 GHz) is being used for general-purpose communication. This shared-license-access band of frequencies is referred to as 'Citizens Broadband Radio Service' or CBRS.

In CBRS, a radio node (which is sometimes referred to as a 'Citizens Band Service Device' or CBSD) may provide a grant request to a SAS (a cloud-based service that manages wireless communication in the CBRS) to reserve a portion of the spectrum or bandwidth in the shared-license-access band of frequencies, in a particular geographic region, for its use. For example, a radio node may request a grant to reserve 5 MHz of spectrum from the SAS in a particular geographic region. If the requested portion of the spectrum is available, the SAS may provide a grant response to the radio node with approval of a grant for the requested portion of the spectrum. Then, the radio node may provide a heartbeat request to the SAS to request authorization to transmit in the granted portion of the spectrum. When the radio node receives a subsequent heartbeat response from the SAS, the radio node is authorized to transmit in the granted portion of the spectrum.

However, CBRS falls within a band of frequencies between 3.55 and 3.7 GHz that is infrequently used by higher-priority users, such as by the U.S. Government (and, in particular, the U.S. Navy) and/or for satellite services. When a higher-priority user is currently using a channel in this shared-license-access band of frequencies, the SAS will reject a grant request from a radio node for a portion of the spectrum that overlaps or includes the channel. Consequently, the radio node will need to submit one or more additional grant requests, which will increase the time needed to receive approval and authorization to transmit in the shared-license-access band of frequencies, and thus can adversely impact communication performance and the user experience.

SUMMARY

A radio node that dynamically adjusts a grant request to a computer is described. This radio node includes: a node or connector; and an interface circuit that communicates with the computer. During operation, the interface circuit may receive location information relating to a location of the radio node. Then, the interface circuit may provide the grant request addressed to the computer, where the grant request includes a request to reserve a portion of a shared-license-access band of frequencies for use by the radio node, and the portion of the shared-license-access band of frequencies is based at least in part on the location information.

Note that the location information may indicate whether the radio node is included in a geographic region or a range of locations. For example, the geographic region may include locations within a predefined distance from a boundary, such as a coastline or a sea or ocean-to-land interface.

When the location information indicates the radio node is included in the geographic region, the portion of the shared-license-access band of frequencies may be outside of a second portion of the shared-license-access band of frequencies that is selectively used by a government user or a satellite service. For example, the shared-license-access band of frequencies may include a CBRS, and the second portion of the shared-license-access band of frequencies may include a first 100 MHz in the CBRS. Alternatively, when the location information indicates the radio node is outside of the geographic region, the portion of the shared-license-access band of frequencies may selectively include the second portion of the shared-license-access band of frequencies.

Moreover, receiving the location information may include accessing the location information at a memory location in the radio node. This memory location may be included in or specified by a type of non-transitory device, such as: a register that stores the location information, a fuse, or a connector that receives a voltage corresponding to the location information. Furthermore, receiving the location information may include determining the location of the radio node. For example, the location may be determined using triangulation and/or trilateration. Alternatively or additionally, the location may be inferred from another type of measurement. In some embodiments, the location information is received from another electronic device, such as: a controller of the radio node, a cellular-telephone network, a wireless local area network and/or a Global Positioning System.

Additionally, the communication with the computer may use wired communication.

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the computer.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A radio node that dynamically adjusts a grant request to a computer is described. During operation, the radio node may have or may receive location information that is based on a location of the radio node. Then, the radio node may provide the grant request to the computer, where the grant request includes a request to reserve a portion of a shared-license-access band of frequencies for use by the radio node, and the portion of the shared-license-access band of frequencies is based at least in part on the location information. Note that the location information may indicate whether the radio node is located in a geographic region or a range of locations. For example, the geographic region may include locations within a predefined distance from a boundary, such as a coastline or a sea or an ocean-to-land interface. When the location information indicates the radio node is within the geographic region, the portion of the shared-license-access band of frequencies that is requested by the radio node may be outside of a second portion of the shared-license-access band of frequencies that is selectively used by a government user or a satellite service. For example, the shared-license-access band of frequencies may include a CBRS, and the second portion of the shared-license-access band of frequencies may include a first 100 MHz in the CBRS.

By dynamically adjusting the grant request, this communication technique may increase the likelihood or probability that the grant request is approved by the computer (such as a SAS). Notably, by avoiding the second portion of the shared-license-access band of frequencies when the radio node is within the geographic region, the grant request may avoid having the grant request rejected because of the selective use by the government user or the satellite service, which have higher priority. Consequently, the communication technique may help ensure that the radio node receives a grant and the ability to transmit in the shared-license-access band of frequencies using its first grant request. In so doing, the communication technique may reduce the time needed for the radio node to initiate operation in the shared-license-access band of frequencies.

Moreover, if the radio node receives approval and authorization to use a channel in the second portion of the shared-license-access band of frequencies, the computer may revoke the grant when a higher-priority user transmits in the second portion of the shared-license-access band of frequencies. When this occurs, the radio node may need to submit one or more additional grant requests to obtain the right to transmit in another portion of the of the shared-license-access band of frequencies. Once again, this may result in increased time delays and/or disruption of communication. By avoiding the grant requests for a channel in the second portion of the shared-license-access band of frequencies when use by a higher-priority user is possible, the communication technique may avoid this scenario, thereby reducing or eliminating the time delays and helping to maintain the communication performance.

We now describe some embodiments of the communication technique. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. As noted previously, when there is a higher-priority user, such as a government user or a satellite service, a grant request for a portion of the shared-license-access band of frequencies that is being used by the government user or the satellite service may be rejected, or an already-granted request may be revoked. This may force the radio node to submit one or more additional grant requests, which will increase the time needed for the radio node to receive eventual approval and, thus, the ability to transmit in the shared-license-access band of frequencies. These time delays may degrade communication performance in a network that includes the radio node.

These challenges are addressed in the communication technique described below. Notably, higher-priority users typically occur in certain geographic regions. For example, radar signals in the CBRS associated with the U.S. Navy (such as ship-born radar) only occur in proximity to large bodies of water (such as, e.g., within 50, 100 or 150 miles of the coastline). As described further below, in the communication technique this location information may be used to increase the likelihood or probability that a given grant request from a radio node is approved, and may reduce the likelihood or probability that an already granted request is revoked.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

Figure 1:
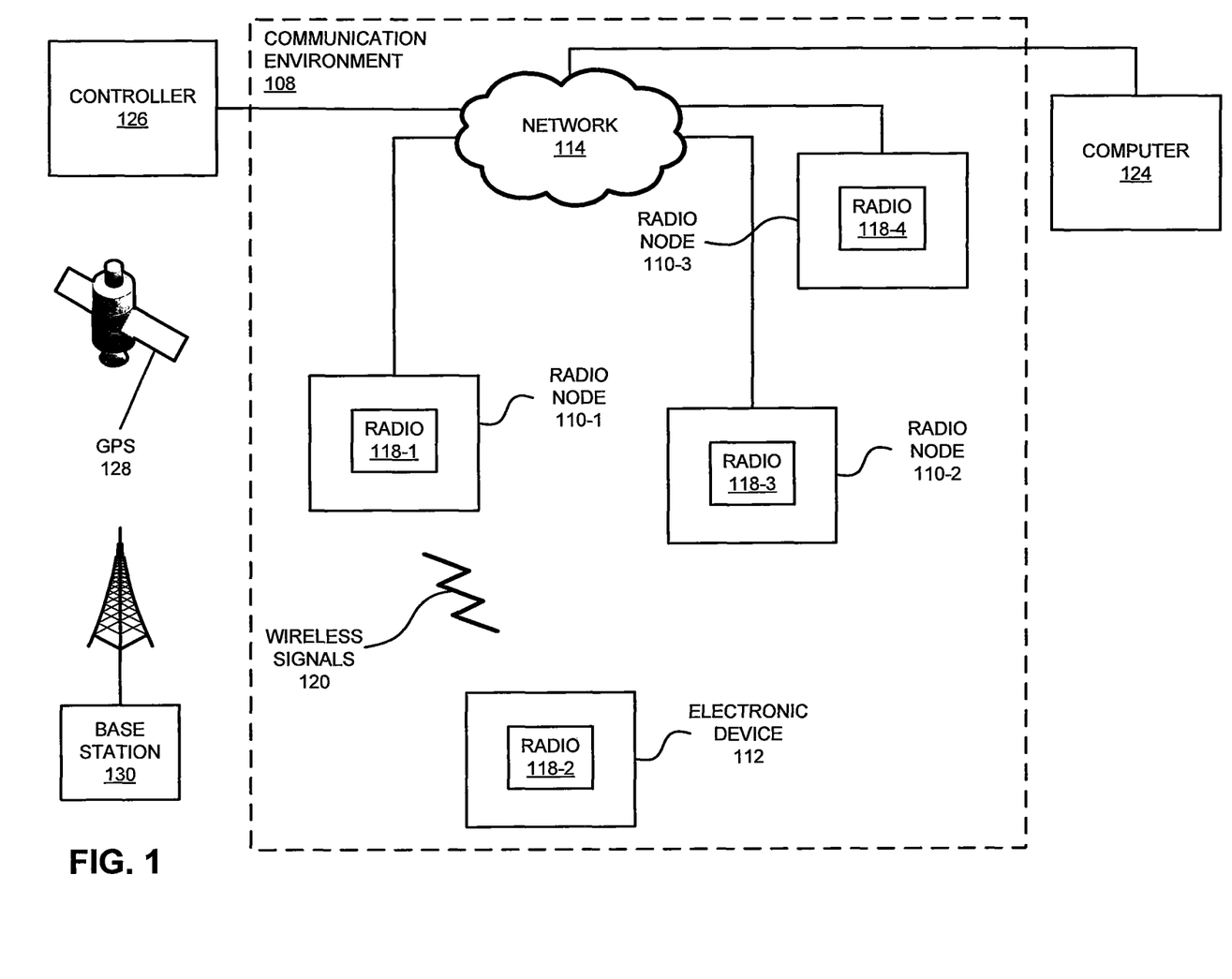
FIG. 1 is a block diagram illustrating an example of communication among a computer, radio nodes and electronic devices in a system in accordance with an embodiment of the present disclosure.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a portable electronic device). Again, while LTE is used as an example of a cellular protocol, the embodiments herein are not so limited. Moreover, radio nodes 110 may also communicate (via wireless or wired communication, such as Ethernet, in network 114) with each other and with computer 124 (such as a SAS).

Figure 2:
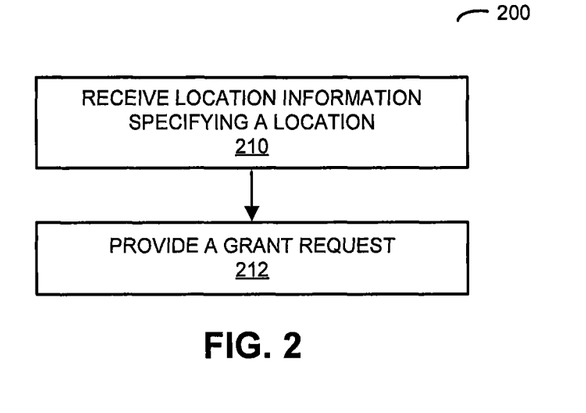
FIG. 2 is a flow diagram illustrating an example of a method for dynamically adjusting a grant request using a radio node in FIG. 1 in accordance with an embodiment of the present disclosure.

As described further below with reference to FIGS. 2-4, one or more of radio nodes 110 may perform a communication technique by communicating with computer 124 via network 114. Using radio node 110-1 as an example, this radio node may provide a grant request to computer 124 to reserve a portion of a spectrum or bandwidth (such as a portion of the spectrum in a shared-license-access band of frequencies or another band of frequencies) for its use. For example, radio node 110-1 may request a grant to reserve 5, 10, 20, 40, 80, 100 or 150 MHz of spectrum in CBRS from computer 124. In response, computer 124 may provide a grant response to radio node 110-1 with approval of a grant for the requested portion of the spectrum.

However, as discussed previously, when a higher-priority user is present and using a channel in the portion of the shared-license-access band of frequencies, the grant request from radio node 110-1 will be rejected by computer 124. When this happens, radio node 110-1 may need to submit one or more additional grant requests for one or more different portions of the shared-license-access band of frequencies in order to eventually receive an allocation of a portion of the shared-license-access band of frequencies for use by radio node 110-1.

In order to prevent these problems, in the communication technique radio node 110-1 may dynamically adjust the grant request based on a location of radio node 110-1 or location information relating to a location of radio node 110-1. Notably, radio node 110-1 may dynamically adjust the grant request when radio node 110-1 is located in a geographic region where a higher-priority user can occur. For example, the geographic region may include locations within a predefined distance from a boundary, such as within 50, 100 or 150 miles of a coastline or a sea or ocean-to-land interface.

Notably, when the location information indicates radio node 110-1 is included in the geographic region, the portion of the shared-license-access band of frequencies in the grant request may be outside of a second portion of the shared-license-access band of frequencies that is selectively used by a government user or a satellite service. For example, the shared-license-access band of frequencies may include a CBRS, and the second portion of the shared-license-access band of frequencies may include a first 100 MHz in the CBRS. Alternatively, when the location information indicates radio node 110-1 is outside of the geographic region, the portion of the shared-license-access band of frequencies may selectively include the second portion of the shared-license-access band of frequencies.

Radio node 110-1 may receive, determine and/or obtain location information. In some embodiments, the location information may indicate whether or not the radio node is located within a geographic region where a higher-priority user can occur. The radio node 110-1 may, e.g., access the location information at a memory location in radio node 110-1. This memory location may be included in or specified by a type of non-transitory device, such as: a register that stores the location information (e.g., a bit that specifies a location flag), a fuse that that specifies when the location is (or is not) within the geographic region based at least in part on a state of the fuse (such as open or closed), or a connector that receives a voltage corresponding to the location information. Alternatively or additionally, radio node 110-1 may determine its location using: triangulation, trilateration and/or by inference based at least in part on another type of measurement (such as a pressure or altitude measurement, a magnetic-field measurement, etc.) and then may generate the location information by determining whether the determined location of radio node 110-1 is within the geographic region. In some embodiments, location information related to the location (or information from which the location or the location information may be determined) may be received from one or more other electronic devices, such as: an optional controller 126 of radio node 110-1, a base station 128 in a cellular-telephone network, a wireless local area network and/or a Global Positioning System 130. For example, a cell in the cellular-telephone network or the wireless local area network may be associated with a location, and radio node 110-1 may determine the location information when wireless signals associated with the cellular-telephone network or the wireless local area network are received.

At least some of the aforementioned operations in the communication technique may be repeated so that radio node 11Q-1 can dynamically adapt to changes in the location of radio node 110-1 in communication environment 108. For example, the communication technique may receive or determine the location information once (such as when radio node 110-1 is turned on), periodically, or as needed (such as when radio node 110-1 is moved or repositioned).

In this way, the communication technique may dynamically ensure that the grant request avoids, when needed, a portion of the shared-license-access band of frequencies that is selectively used by a government user and/or a satellite service. This may help increase the likelihood or probability that the grant request is approved by computer 124 and/or not revoked later in favor of a higher priority user, and therefore may reduce or eliminate the need for one or more additional grant requests. Consequently, the communication technique may reduce or eliminate delays and may improve communication performance.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
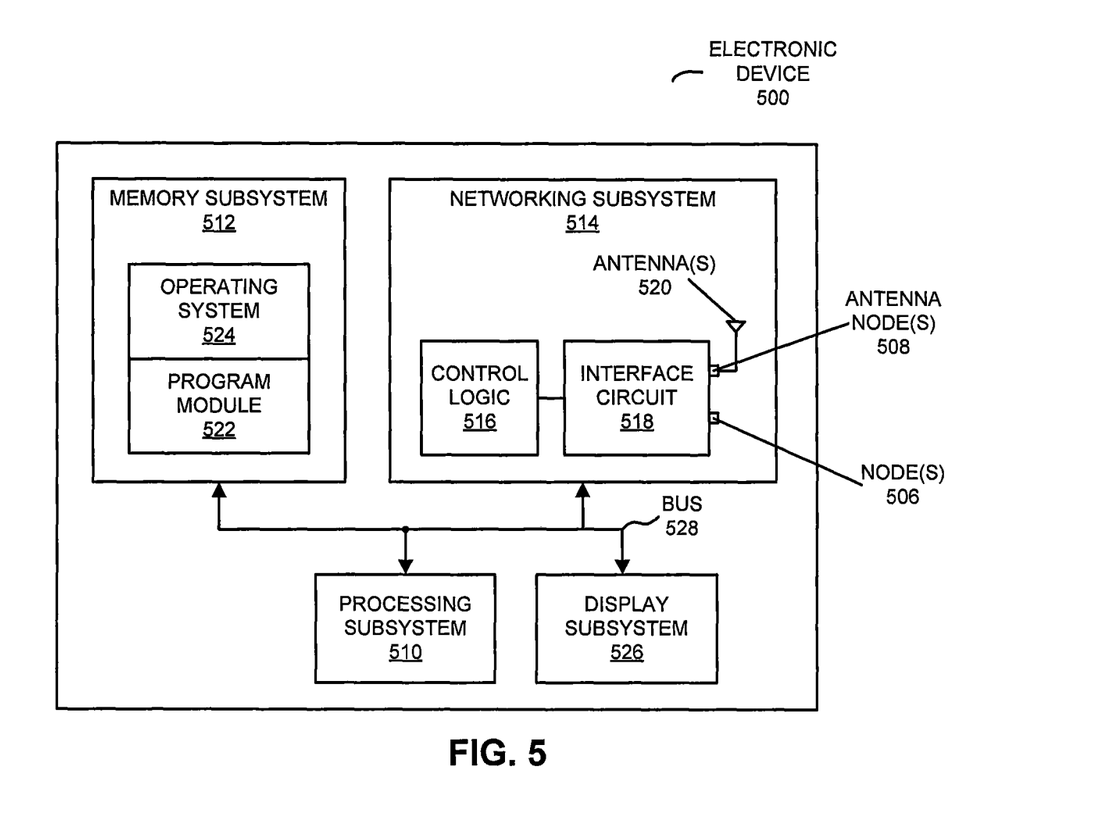
FIG. 5 is a block diagram illustrating an example of an electronic device in accordance with an embodiment of the present disclosure.

As described further below with reference to FIG. 5, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

We now describe embodiments of the method. FIG. 2 presents a flow diagram illustrating an example of a method 200 for dynamically adjusting a grant request, which may be performed by a radio node (such as one of radio nodes 110 in FIG. 1). During operation, an interface circuit in the radio node may receive location information (operation 210) that is based at least in part on a location of the radio node. The location information may include, e.g., an indication as to whether or not the radio node is located within a geographic region where a higher-priority user may be present. Then, the interface circuit may provide the grant request (operation 212) to a computer, where the grant request includes a request to reserve a portion of a shared-license-access band of frequencies for use by the radio node, and the portion of the shared-license-access band of frequencies is based at least in part on the location information.

Note that the location information may indicate whether the radio node is included in a geographic region or a range of locations. For example, the geographic region may include locations within a predefined distance from a boundary, such as a coastline or a sea or ocean-to-land interface.

When the location information indicates the radio node is included in the geographic region, the portion of the shared-license-access band of frequencies may be outside of a second portion of the shared-license-access band of frequencies that is selectively used by a government user or a satellite service. For example, the shared-license-access band of frequencies may include a CBRS, and the second portion of the shared-license-access band of frequencies may include a first 100 MHz in the CBRS. Alternatively, when the location information indicates the radio node is outside of the geographic region, the portion of the shared-license-access band of frequencies may selectively include the second portion of the shared-license-access band of frequencies. For example, the grant request may, as needed, specify a portion of the shared-access-license band of frequencies that is included in or that overlaps with the second portion of the shared-license-access band of frequencies.

Moreover, receiving the location information may include accessing the location information at a memory location in the radio node. This memory location may be included in or specified by a type of non-transitory device, such as: a register that stores the location information, a state of a fuse, or a connector that receives a voltage corresponding to the location information. Furthermore, receiving the location information may include determining the location of the radio node. For example, the location of the radio node may be determined using triangulation and/or trilateration. Alternatively or additionally, the location of the radio node may be inferred from another type of measurement. For example, the location of the radio node may be correlated with other information in order to determine the location information. In some embodiments, the location information is received from another electronic device, such as: a controller of the radio node, a cellular-telephone network, a wireless local area network and/or a Global Positioning System.

Additionally, the communication with the computer may use wired communication.

Note that the radio node may include: an eNodeB, a UMTS NodeB and RNC, a New Radio (NR) gNB or gNodeB, etc.

In some embodiments of method 200, there may be additional or fewer operations. Furthermore, the order of the operations may be changed, and/or two or more operations may be combined into a single operation.

Figure 3:
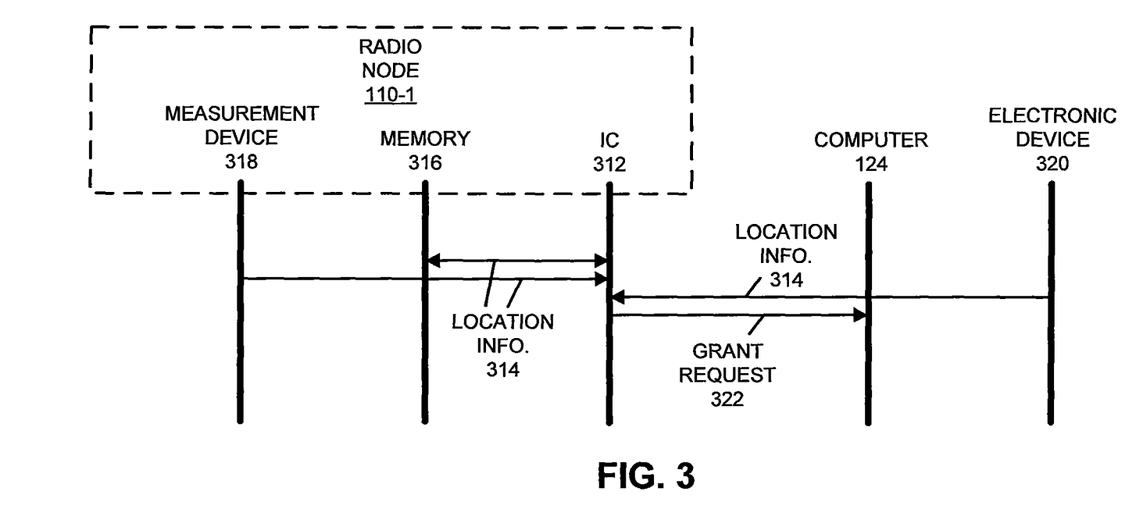
FIG. 3 is a drawing illustrating an example of communication among the electronic devices in FIG. 1 in accordance with an embodiment of the present disclosure.

Embodiments of the communication technique are further illustrated in FIG. 3, which presents a drawing illustrating an example of communication among radio node 110-1 and computer 124. In FIG. 3, an interface circuit (IC) 312 in radio node 110-1 may receive location information 314 that is based at least in part on a physical location of radio node 110-1. For example, interface circuit 312 may access location information 314 that is stored in memory 316 in radio node 110-1. Alternatively or additionally, measurement device 318 in radio node 110-1 may determine the physical location of radio node 110-1 and this physical location may be used to generate location information 314, which is then provided to interface circuit 312. In some embodiments, the location information may comprise an indication as to whether or not radio node 110-1 is located within a geographic region where a higher-priority user may be present. Moreover, in some embodiments, interface circuit 312 receives the location or location information 314 from another electronic device 320, such as: a controller of radio node 110-1, a cellular-telephone network, a wireless local area network and/or a Global Positioning System.

Then, interface circuit 312 may provide a grant request 322 to computer 124, where grant request 322 includes a request to reserve a portion of a shared-license-access band of frequencies for use by radio node 110-1, and the portion of the shared-license-access band of frequencies is based at least in part on the location information. As discussed previously, the location information may indicate whether radio node 110-1 is included in a geographic region or a range of locations. When the location information indicates radio node 110-1 is included in the geographic region, the portion of the shared-license-access band of frequencies may be outside of a second portion of the shared-license-access band of frequencies that is selectively used by a government user or a satellite service. Alternatively, when the location information indicates radio node 110-1 is outside of the geographic region, the portion of the shared-license-access band of frequencies may selectively include the second portion of the shared-license-access band of frequencies.

While FIG. 3 illustrates communication between components using unidirectional or bidirectional communication with lines having single arrows or double arrows, in general the communication in a given operation in this figure may involve unidirectional or bidirectional communication.

In some embodiments of the communication technique, a radio node uses location information to increase the probability that grant requests are approved. For example, when the radio node is located within a geographic region where there are higher priority users, the radio node may request grant allocations for different portions of a shared-access-license band of frequencies than those used by the higher priority users.

Figure 4:
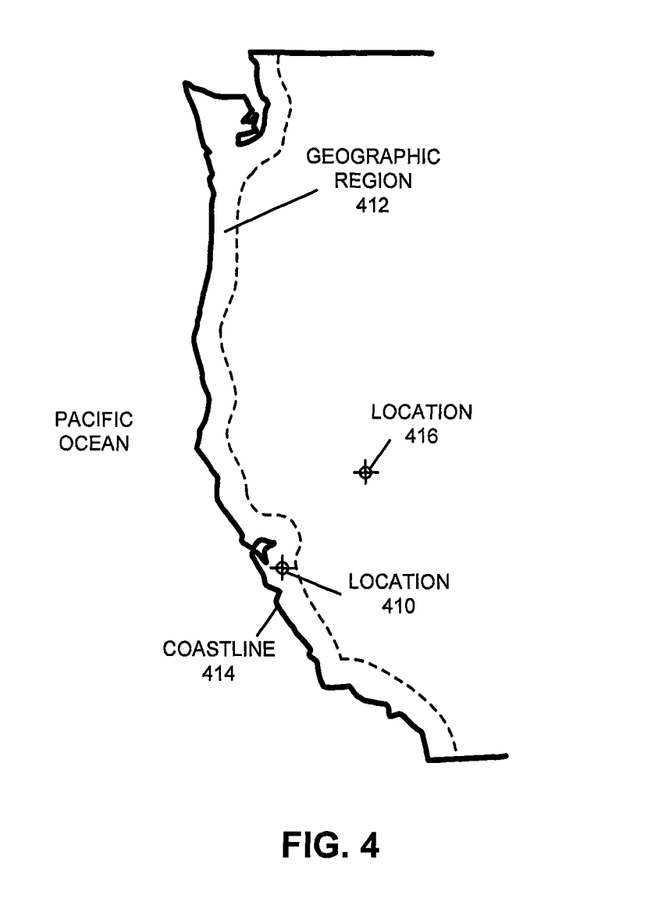
FIG. 4 is a drawing illustrating an example of a technique for dynamically adjusting a grant request in accordance with an embodiment of the present disclosure.

This is illustrated in FIG. 4, which presents a drawing illustrating an example of a technique for dynamically adjusting a grant request from a CBSD to a SAS. Notably, when a CBSD is at a location 410 in a geographic region 412 near or proximate to a coastline 414 (such as, e.g., within 50, 100 or 150 miles of coastline 414), this CBSD may provide a' grant request for a portion of the last 50 MHz in the CBRS to the SAS (i.e., between 3.65 and 3.7 GHz). Thus, the CBSD may avoid requesting any of the first 100 MHz in the CBRS. Alternatively, when a CBSD is at a location 416 is outside of geographic region 412, this CBSD may provide a grant request any portion of the 150 MHz in the CBRS to the SAS.

While FIG. 4 illustrates the West-coast of the United States of America, in other embodiments the communication may be applied to an arbitrary geographic region that is located proximate to or near a boundary, which may include a different boundary than a coastline, such as a border between countries. The geographic region may also include a series of separate geographic regions (e.g., both the West-coast coastline region and the East-coast/Gulf-coast coastline regions).

We now describe embodiments of an electronic device, which may perform at least some of the operations in the communication technique. FIG. 5 presents a block diagram illustrating an example of an electronic device 500 in accordance with some embodiments, such as one of radio nodes 110, electronic device 112 computer 124. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs or program modules may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a pad, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Thus, the communication technique may be implemented at runtime of program module 522. Alternatively or additionally, at least some of the operations in the communication technique may be implemented in a physical layer, such as hardware in interface circuit 518.

While examples of numerical values are provided in the preceding discussion, in other embodiments different numerical values are used. Consequently, the numerical values provided are not intended to be limiting.

While the preceding embodiments illustrated the use of the communication technique with CBRS (e.g., a frequency band near 3.5 GHz), in other embodiments of the communication technique different wireless signals and/or different frequency band(s) may be used. For example, the wireless signals may be communicated in one or more bands of frequencies, including: 900 MHz, 2.4 GHz, 5 GHz, 60 GHz, and/or a band of frequencies used by LTE or another cellular-telephone communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
an interface circuit configured to communicate with a computer; and
a second interface circuit configured to wirelessly communicate in a shared-license-access band of frequencies, wherein the radio node is configured to:
receive location information relating to a location of the radio node, wherein the radio node is different from a spectrum allocation server; and
provide, via the interface circuit, a grant request addressed to the computer, wherein the grant request comprises a request to reserve a portion of the shared-license-access band of frequencies for use by the radio node, and the portion of the shared-license-access band of frequencies is based at least in part on the location information.

2. The radio node of claim 1, wherein the location information indicates whether the radio node is included in a geographic region.

3. The radio node of claim 2, wherein the geographic region comprises locations within a predefined distance from a boundary.

4. The radio node of claim 3, wherein the boundary comprises a coastline.

5. The radio node of claim 2, wherein, when the location information indicates the radio node is included in the geographic region, the portion of the shared-license-access band of frequencies is outside of a second portion of the shared-license-access band of frequencies that is selectively used by a government user or a satellite service.

6. The radio node of claim 5, wherein the shared-license-access band of frequencies comprises a Citizens Broadband Radio Service (CBRS), and the second portion of the shared-license-access band of frequencies comprises a first 100 MHz in the CBRS.

7. The radio node of claim 2, wherein, when the location information indicates the radio node is outside of the geographic region, the portion of the shared-license-access band of frequencies selectively includes a second portion of the shared-license-access band of frequencies.

8. The radio node of claim 1, wherein receiving the location information comprises accessing the location information at a memory location in the radio node.

9. The radio node of claim 8, wherein the memory location is included in or specified by a type of non-transitory device.

10. The radio node of claim 9, wherein the type of non-transitory device comprises: a register that stores the location information, a fuse, or a connector configured to receive a voltage corresponding to the location information.

11. The radio node of claim 1, wherein receiving the location information comprises determining the location of the radio node and generating the location information based at least in part on the location.

12. The radio node of claim 11, wherein the location of the radio node is determined using at least one of: triangulation, trilateration, or another type of measurement.

13. The radio node of claim 1, wherein the location information is associated with another electronic device.

14. The radio node of claim 1, wherein communication with the computer comprises wired communication.

15. The radio node of claim 1, wherein an Evolved Node B (eNodeB), a Universal Mobile Telecommunications System (UMTS) NodeB and radio network controller (RNC), or a New Radio (NR) gNB or gNodeB.

16. A non-transitory computer-readable storage medium for use in conjunction with a radio node configured to communicate wirelessly in a shared-license-access band of frequencies, the computer-readable storage medium storing program instructions that, when executed by the radio node, cause the radio node to perform operations comprising:
receiving location information relating to a location of the radio node, wherein the radio node is different from a spectrum allocation server; and
providing, via an interface circuit in the radio node that performs communication, a grant request addressed to a computer, wherein the grant request comprises a request to reserve a portion of the shared-license-access band of frequencies for use by the radio node, and the portion of the shared-license-access band of frequencies is based at least in part on the location information.

17. The non-transitory computer-readable storage medium of claim 16, wherein the location information indicates whether the radio node is included in a geographic region; and
wherein the geographic region comprises locations within a predefined distance from a boundary.

18. The non-transitory computer-readable storage medium of claim 17, wherein, when the location information indicates the radio node is included in the geographic region, the portion of the shared-license-access band of frequencies is outside of a second portion of the shared-license-access band of frequencies that is selectively used by a government user or a satellite service.

19. The non-transitory computer-readable storage medium of claim 16, wherein receiving the location information comprises one of: accessing the location information at a memory location in the radio node; determining the location of the radio node and generating the location information based at least in part on the location; or receiving the location information associated with another electronic device.

20. A method for dynamically adjusting a grant request, comprising:
by a radio node that communicates wirelessly in a shared-license-access band of frequencies:
receiving location information relating to a location of the radio node, wherein the radio node is different from a spectrum allocation server; and
providing, via an interface circuit in the radio node that performs communication, a grant request addressed to a computer, wherein the grant request comprises a request to reserve a portion of the shared-license-access band of frequencies for use by the radio node, and the portion of the shared-license-access band of frequencies is based at least in part on the location information.

* * * * *